Figure 1:
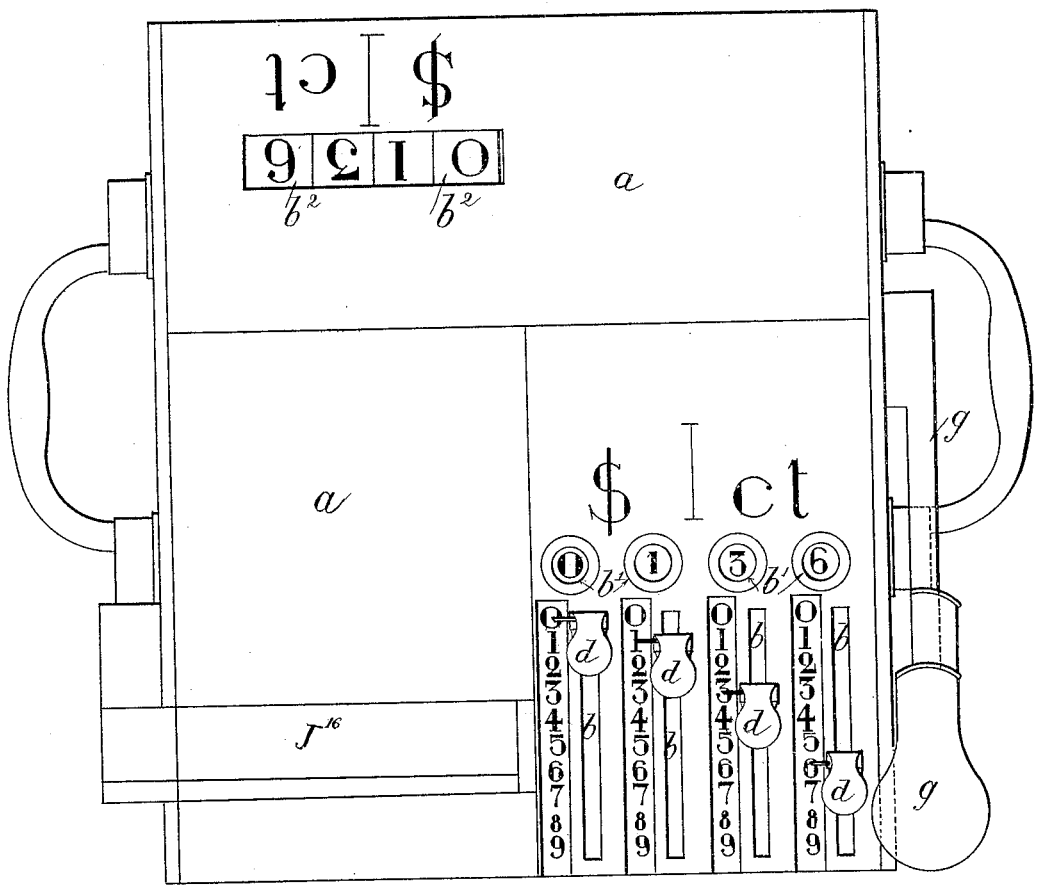

(No Model.)  13 Sheets—Sheet 1.

H. POTTIN.
CASH REGISTERING AND STAMPING DESK.

No. 597,068. Patented Jan. 11, 1898.

Witnesses:
John Maupin.
L. C. Hills

Inventor
Henri Pottin
by Wm H Babcock
Attorney (No Model.) 13 Sheets—Sheet 2.

H. POTTIN.
CASH REGISTERING AND STAMPING DESK.

No. 597,068. Patented Jan. 11, 1898.

(No Model.)

13 Sheets—Sheet 3.

H. POTTIN.
CASH REGISTERING AND STAMPING DESK.

No. 597,068. Patented Jan. 11, 1898.

Witnesses:
John Maupin
L. C. Hills

Inventor
Henri Pottin
by Wm H Babcock
Attorney (No Model.)

13 Sheets—Sheet 4.

H. POTTIN.
CASH REGISTERING AND STAMPING DESK.

No. 597,068. Patented Jan. 11, 1898.

Witnesses
John Maupin.
L. C. Hills

Inventor
Henri Pottin
by Wm H Babcock
Attorney (No Model.) 13 Sheets—Sheet 7.

H. POTTIN.
CASH REGISTERING AND STAMPING DESK.

No. 597,068. Patented Jan. 11, 1898.

Witnesses
John Maupin
L. C. Hills

Inventor
Henri Pottin
by Wm H Babcock
Attorney (No Model.)  13 Sheets—Sheet 8.
H. POTTIN.
CASH REGISTERING AND STAMPING DESK.

No. 597,068. Patented Jan. 11, 1898.

Witnesses:
John Maupin.
L. C. Hills.

Inventor
Henri Pottin
by Wm H Babcock
Attorney (No Model.)　　　　　　　　　　　　　　　　13 Sheets—Sheet 9.
H. POTTIN.
CASH REGISTERING AND STAMPING DESK.

No. 597,068.　　　　　　　　　Patented Jan. 11, 1898.

Witnesses,
John Maupin
L. C. Hills

Inventor
Henri Pottin
by Wm H Babcock
Atty (No Model.) 13 Sheets—Sheet 10.
H. POTTIN.
CASH REGISTERING AND STAMPING DESK.

No. 597,068. Patented Jan. 11, 1898.

Witnesses:
John Maupin.
L. C. Hills.

Inventor
Henri Pottin
by Wm H Babcock
Att'ys (No Model.) 13 Sheets—Sheet 11.
H. POTTIN.
CASH REGISTERING AND STAMPING DESK.
No. 597,068. Patented Jan. 11, 1898.
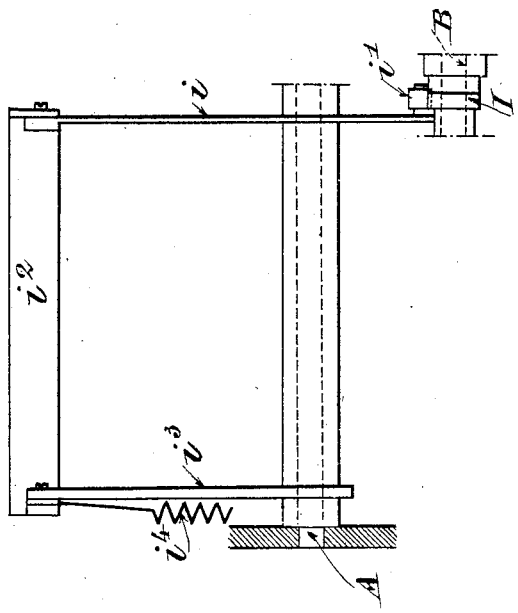
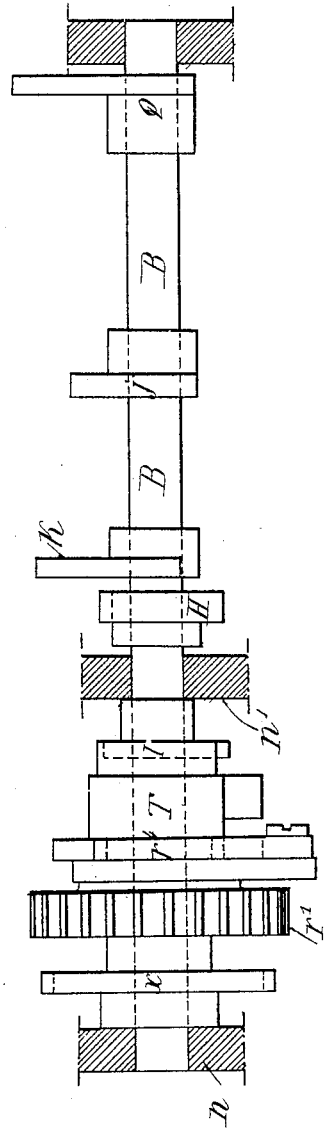
Witnesses:
John Maupin.
L. C. Hills.
Inventor
Henri Pottin
by Wm H Babcock
Atty (No Model.)

13 Sheets—Sheet 12.

H. POTTIN.
CASH REGISTERING AND STAMPING DESK.

No. 597,068. Patented Jan. 11, 1898.

Witnesses:
John Maupin
L. C. Hills

Inventor:
Henri Pottin
by Wm H Babcock
Attorney (No Model.)  13 Sheets—Sheet 13.

H. POTTIN.
CASH REGISTERING AND STAMPING DESK.

No. 597,068. Patented Jan. 11, 1898.

Witnesses:
John Maupin.
L. C. Hills

Inventor
Henri Pottin
by Wm H Babcock
Attorney

UNITED STATES PATENT OFFICE.

HENRY POTTIN, OF PARIS, FRANCE.

CASH REGISTERING AND STAMPING DESK.

SPECIFICATION forming part of Letters Patent No. 597,068, dated January 11, 1898.

Application filed August 2, 1897. Serial No. 646,839. (No model.)

*To all whom it may concern:*

Be it known that I, HENRY POTTIN, civil engineer, of 62 Rue St. Lazare, Paris, in the Republic of France, have invented an Improved Cash Recording and Stamping Mechanism; and I do hereby declare that the following is a full and exact description thereof, reference being made to the accompanying drawings.

My invention relates to a simple and improved cash-registering apparatus the first cost of which is small and which is more particularly useful for firms of average importance. The said apparatus or cash-registering desk shows the buyer the sum he has to pay, stamps the bill, which the cashier then hands over again to the said buyer, and records successively all the sums cashed on a continuous band of paper, which is automatically unwound inside the apparatus. To get each evening the account of the day's receipts, nothing more has to be done than to add up the figures successively inscribed on this paper band.

A shutter covers the window of the apparatus at the buyer's side when the apparatus is at rest, and behind the said shutter there are nothing but ciphers.

When a purchaser comes up to the cashier's desk, the cashier takes the bill given him of the articles he has purchased, acts on the pusher-buttons of the desk which correspond to tens of dollars, dollars, tens of cents, and cents, so as to register the sum specified in the bill. The same pushing action causes the ciphers behind the shutter to be replaced by the figures representing the sum to be paid. Then the cashier brings the bill in engagement with a slot made for that purpose in the apparatus and moves down the operating-lever to its lowermost position, then releases it, when the said lever automatically rises and returns to its first and uppermost position, the apparatus at the same time stamping the bill and recording the sum paid on the continuous paper band, while the shutter uncovers the window at the buyer's side and shows the said buyer the sum which has been recorded by the apparatus. The cashier withdraws the bill and again moves down the operating-lever into its lowermost position, then releases it, when the said lever automatically returns to its normal uppermost position, while the shutter again comes over the window at the buyer's side, the ciphers again take their place behind the said shutter, and the pusher-buttons of the apparatus are automatically brought back to zero. At the moment when the mechanism has returned to its normal position or position of rest a bell is struck, which announces to those interested that the cashier has just cashed the amount of a bill.

For successive receipts the operations remain the same, the cashier having to move down twice the operating-lever for each sum cashed.

Figure 2:
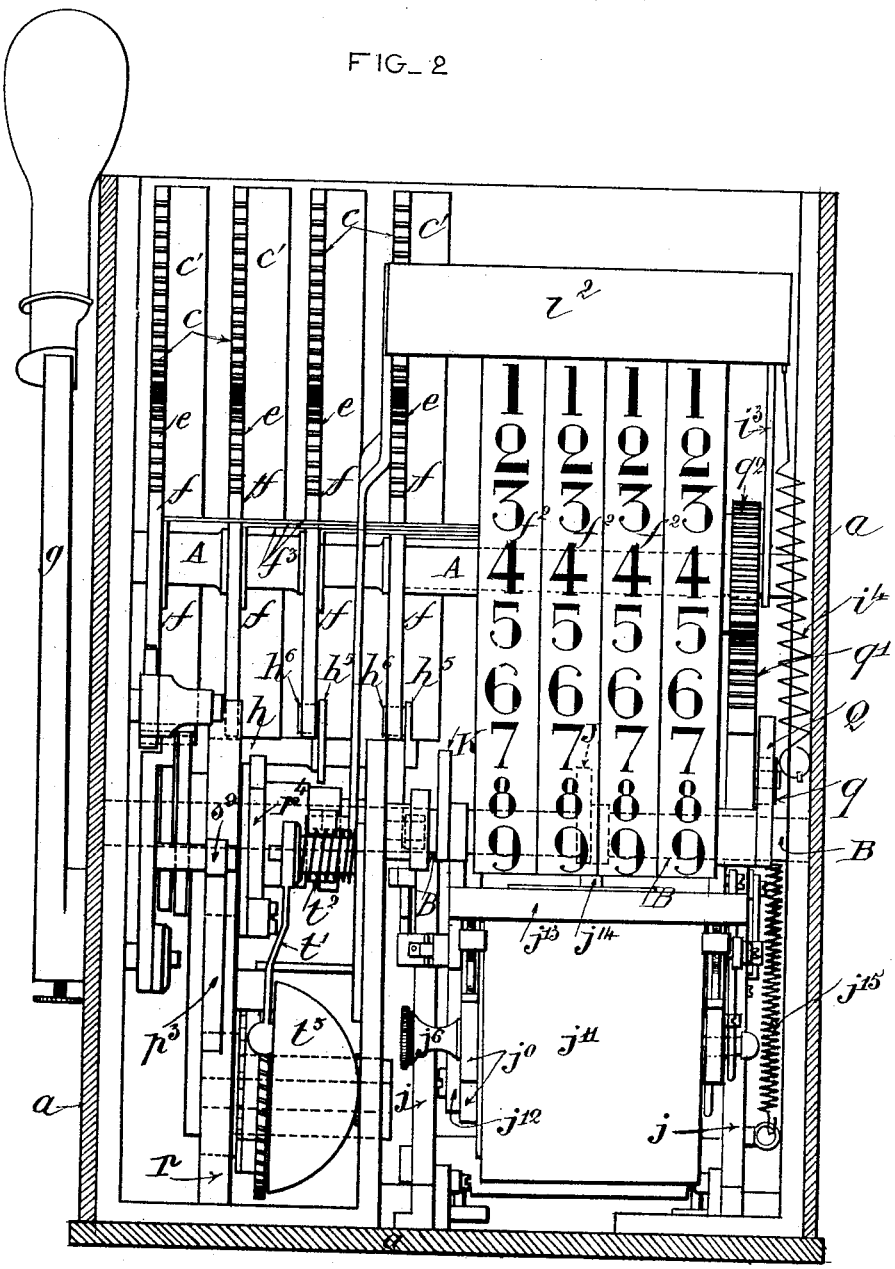
Figure 3:
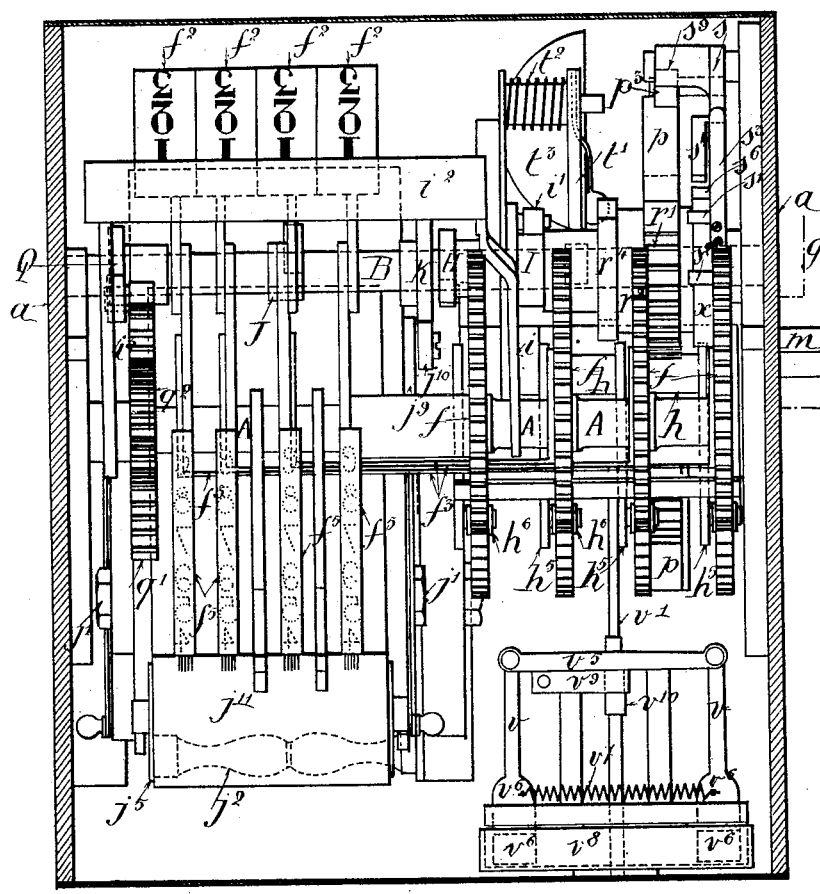
Figure 4:
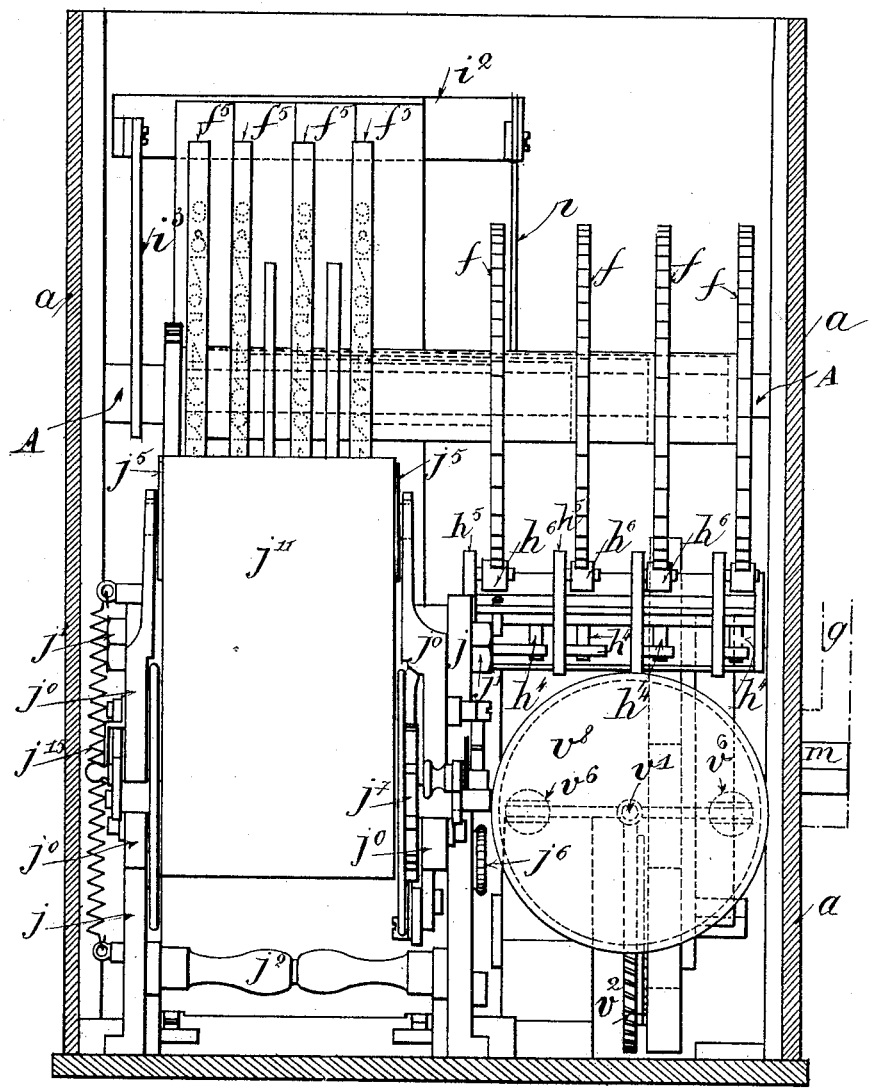
Figure 5:
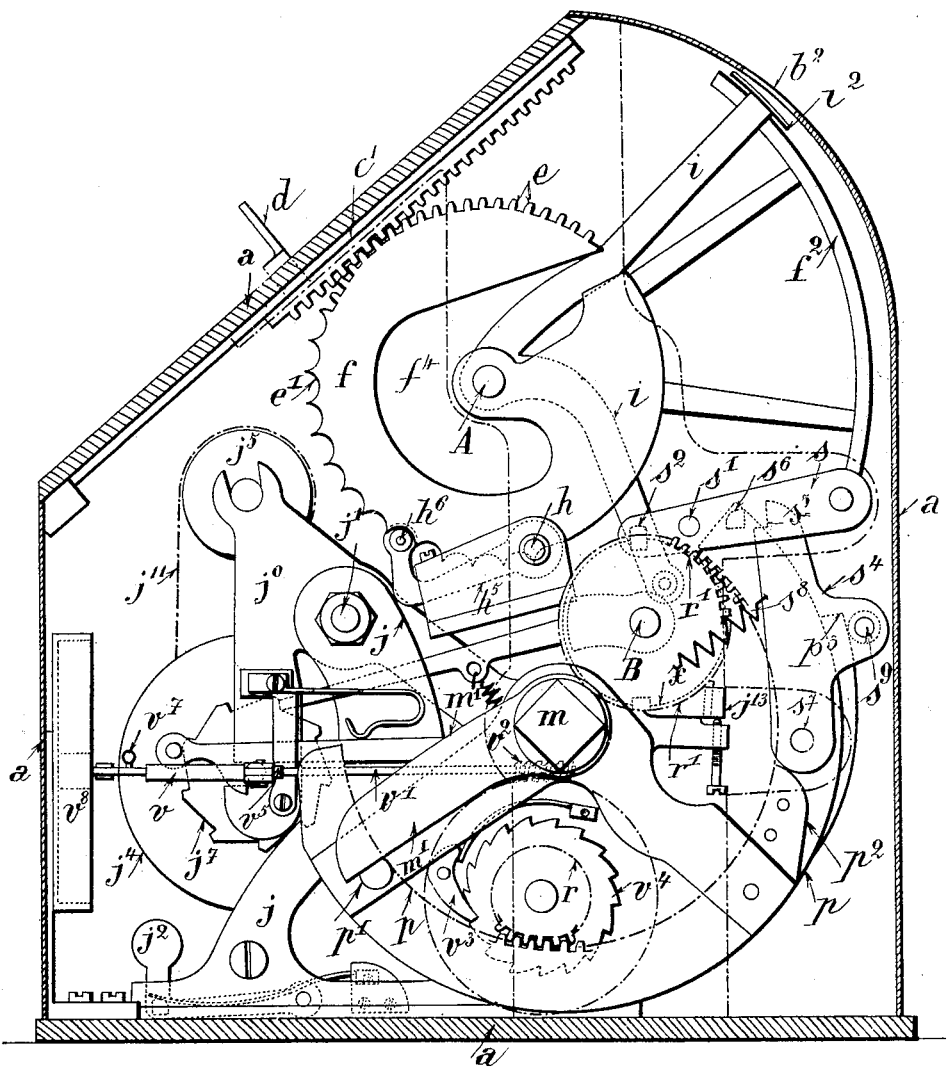
Figure 6:
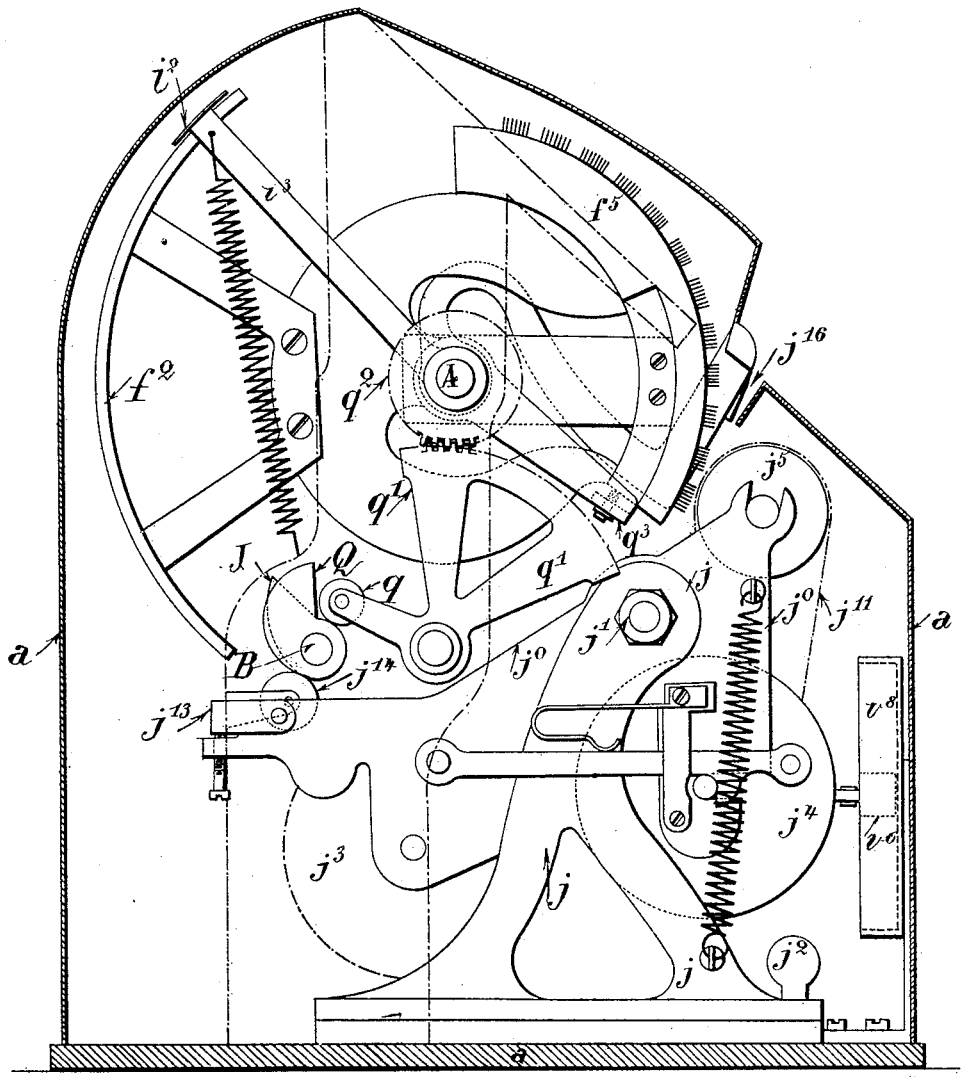
Figure 7:
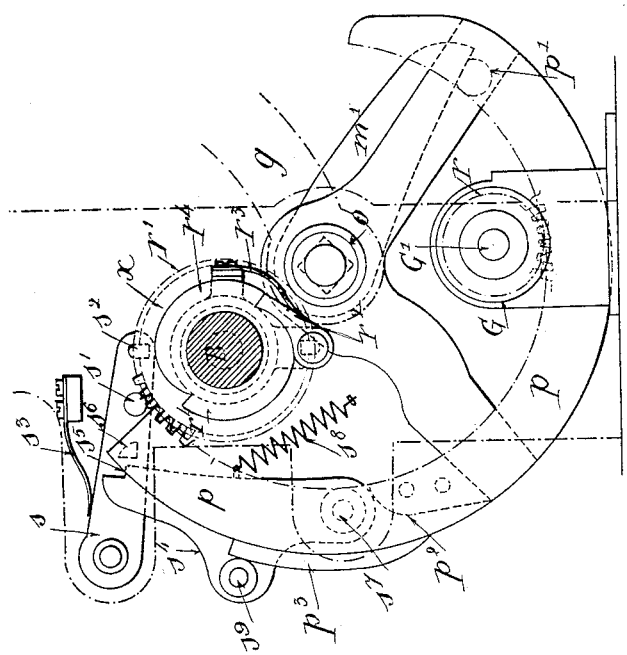
Figure 8:
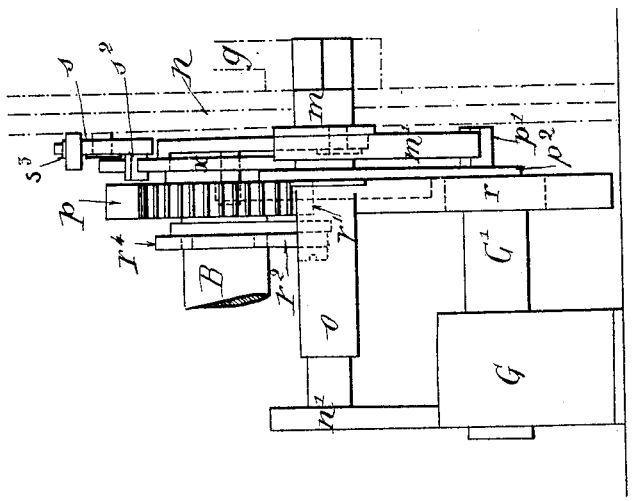
Figure 9:
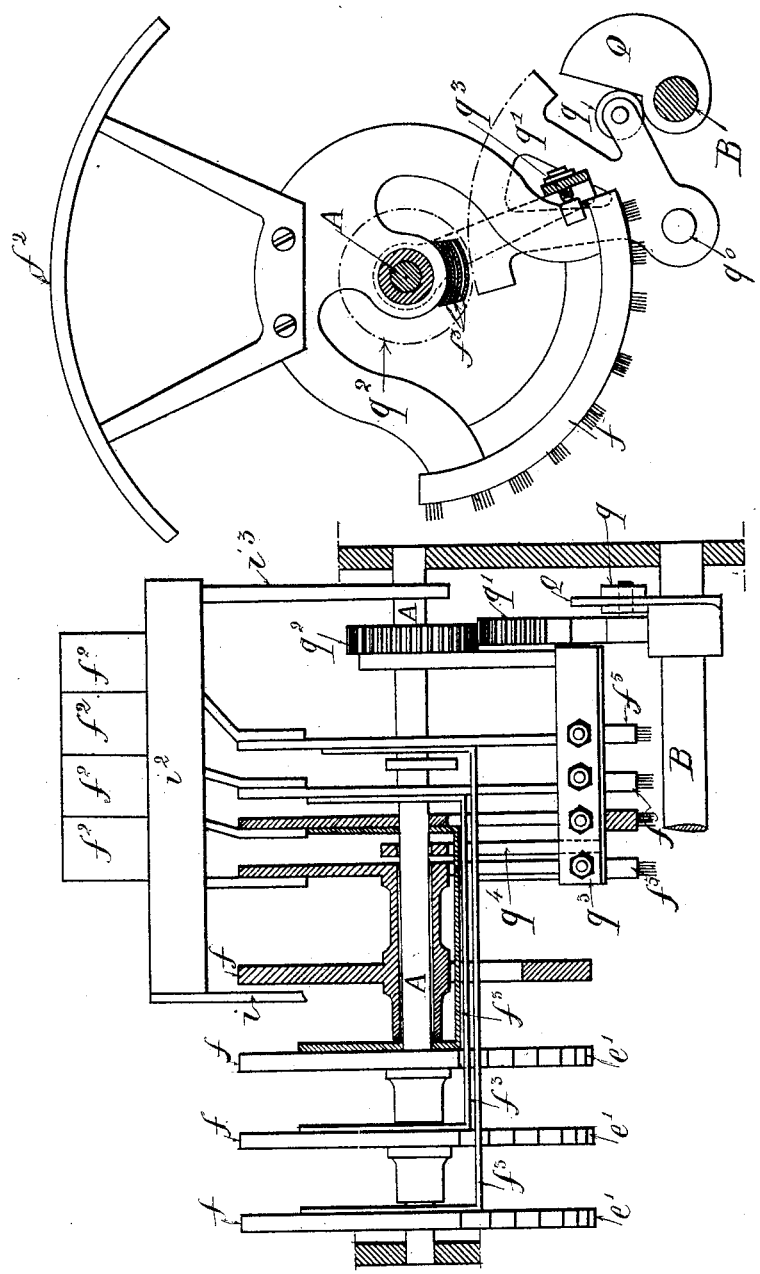
Figure 10:
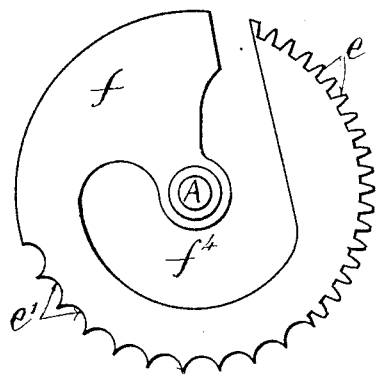
Figure 12:
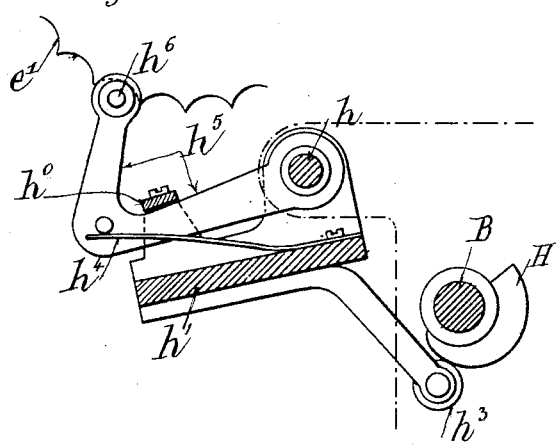
Figure 13:
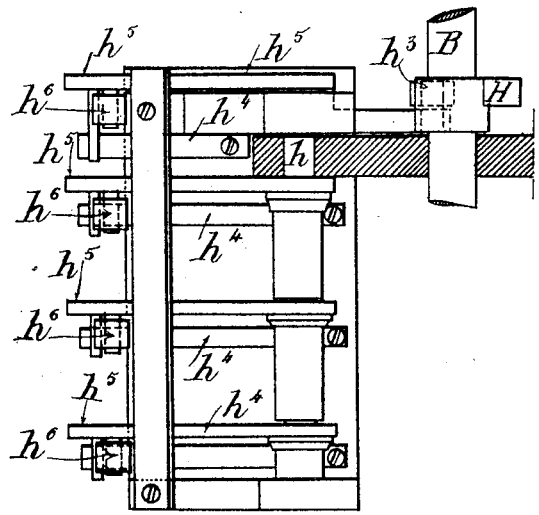
Figure 18:
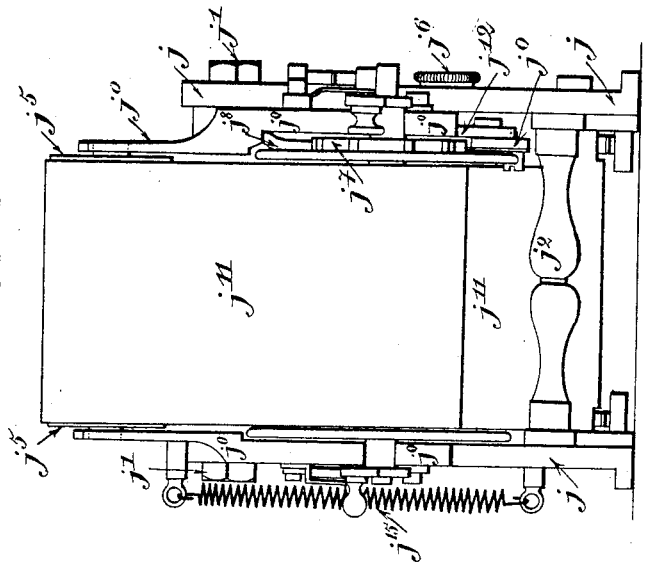
Figure 17:
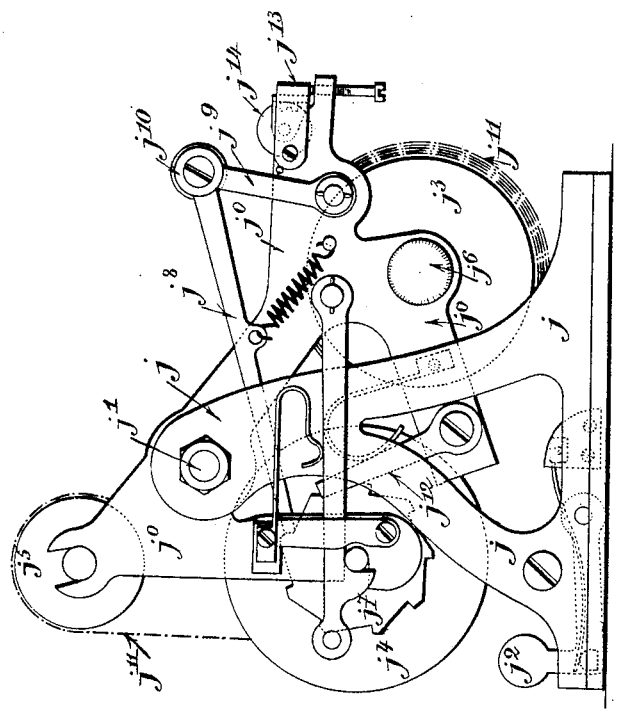
Figure 19:
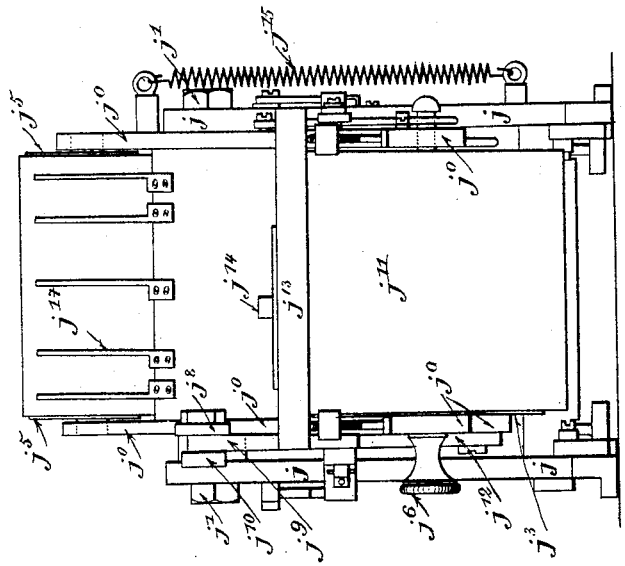
Figure 20:
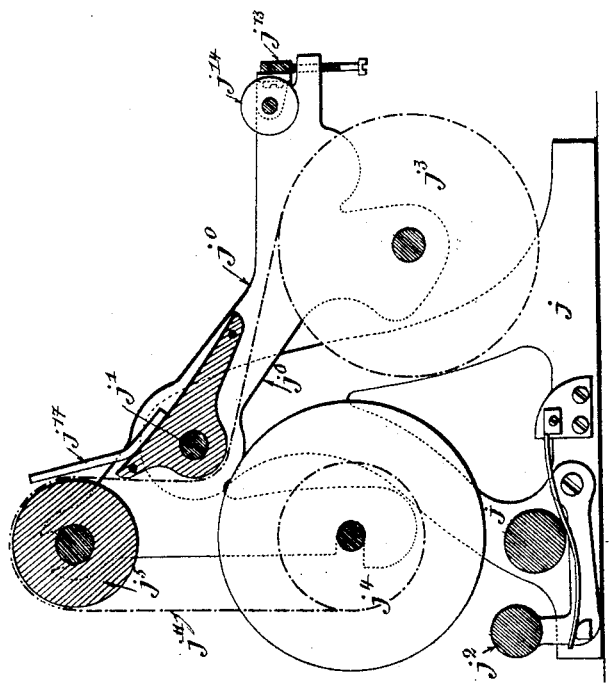

In the accompanying drawings, Figure 1 is an outside plan view of my cash recording and stamping desk. Fig. 2 is an elevation of the apparatus as seen from the buyer's side, the outer casing being removed. Fig. 3 is a general plan view, the outer casing being cut away on a horizontal plane. Fig. 4 is an elevation of the apparatus at the cashier's side, the outer casing being removed. Fig. 5 is a view at the operating-lever end, the outer casing being vertically broken away. Fig. 6 is a view taken at the other end of the apparatus, the outer casing being vertically broken away as before. Figs. 7 and 8 are respectively detail views of the motor mechanism, the former figure being a front elevation and the latter a side elevation. Figs. 9, 10, and 11 relate to the numbered disks and segments of the apparatus. Figs. 12 and 13 represent the device for locking the disks. Figs. 14 and 15 are views of the parts operating the shutter. Fig. 16 is a detail view of the driving-shaft and its cams. Fig. 17 is a side elevation of the recording and stamping apparatus. Figs. 18 and 19 are two end views taken at opposite ends of the recording apparatus, and Fig. 20 is a section of the recording apparatus on the normal line of the paper-rollers.

The casing $a$ of the general frame forms a desk inclining toward the cashier and is provided with openings or ways $b\ b\ b$, &c., Fig. 1, in which can slide the pusher-buttons $d\ d$, which are fixed, respectively, to racks $c\ c$, arranged inside in the inclined part of the frame, Figs. 2 and 5, of the apparatus. The racks $c$ are in gear with the teeth $e\ e$ of special disks $f$, independent of each other, and all loosely mounted on a common shaft A, Figs. 2, 4, 5, and 10. To the said racks $c$ are fixed numbered blades $c'$, so that the figures on the blades may appear successively at windows $b$, made in the inclined part of the frame, between the spaces occupied by the said racks, Figs. 1 and 2. The toothed disks $f$ operate, respectively, segments $f^2$, also loosely mounted on the shaft A. The segments $f^2$ are connected to the disks $f$ by connecting-bars bent at right angles $f^3$, which pass through segmental slots $f^4$ in the disks $f$, Figs. 9, 10, and 11. The first disk $f$ to the left corresponds, by its connecting-bar, to the last segment $f^2$ to the right. The second disk to the left also corresponds, by means of its connecting-bar, to the last segment but one to the right, and so on. Only the fourth or last disk $f$, the hub of which is loosely mounted on the shaft A, is connected directly, by means of the said hub, with the first segment $f^2$, Fig. 9.

As will be seen, the segments and the disks are connected together in inverse order—that is to say, the right disk is connected to the left segment, the second disk to the last segment but one, and so on—in order that the numerical indications given by the cashier shall appear in the same order both at the window $b^2$, Figs. 1 and 5, toward the buyer and at the window $b'$ toward the cashier. Any rotation given to one of the disks $f$ is integrally reproduced on the corresponding segment $f^2$. Each of the segments $f^2$ is rigidly connected to a second segment $f^5$, placed in the same vertical plane at the other side of the shaft A, Figs. 6 and 11. Each segment $f^5$ carries on its periphery points so made as to form figures in relief, which are arranged in the same order as those on the segments $f^2$, so that the figure in relief which comes in front of the recording and stamping roll, to be hereinafter described, will be the same as that of the corresponding segment $f^2$, which appears at the window $b^2$.

The first numbered blade $c'$ to the left, Fig. 2, is numbered from "0" to "9" and corresponds to tens of dollars.

The second blade $c'$ is numbered from "0" to "9" and corresponds to units of dollars.

The third is numbered from "0" to "9" and corresponds to tens of cents.

The fourth blade $c'$, numbered from "0" to "9," corresponds to units of cents.

The segments $f^2$ and $f^5$ are numbered in the same way as the blades $c'$, integral with the racks $c$, which are in gear with the corresponding disks $f$.

Besides the teeth $e\ e\ e$, &c., with which the racks $c$ are in gear, the disks $f$ are also provided at their periphery with other teeth $e'$, between which abutments certain abutments or stops are introduced, as hereinafter described, in order to lock the disks in place during the stamping operation and prevent the possible displacement of the pusher-buttons, Figs. 5, 10 and 12.

A barrel-spring G, Figs. 7 and 8, serves to operate all the mechanisms of the apparatus—that is to say, to record the sum received, to stamp the bill, to work the regulator, to ring the bell, and to bring the disks back to zero. The barrel-spring recovers its tension each time the operating-lever is moved down, and this tension is expended during the automatic upward movement of the said lever. Its tension is therefore constantly renewed whatever the number of operations made with the recording apparatus.

The operating-lever $g$ is fulcrumed on a horizontal shaft $m$, journaled in bearings in brackets or uprights $n$ and $n'$ on the frame. The said shaft $m$ is integral with a radial arm $m'$, placed within the casing of the apparatus and intended to transmit the movement of the operating-lever to the driving mechanism, Figs. 5, 7, and 8.

On the shaft $m$ is loosely mounted a sleeve $o$, forming the hub of a large toothed segment, the teeth $p$ of which are on the inside and which carries on one of its sides a strong pin $p'$, into contact with which is moved the radial arm $m'$, connected to the operating-lever, Figs. 5, 7, and 8.

The segment $p$ gears with two circular pinions, the lower pinion $r$ being fixed on the movable shaft $G'$ of the spring-barrel and the upper pinion $r'$ being loosely mounted on the driving-shaft B, which carries the operating-cam for the several mechanisms of the apparatus. When the lever $g$ is moved down, the segment $p$ is moved forward by the action of the arm $m'$ on the pin $p'$, and the two pinions $r$ and $r'$ turn on their respective axes. In turning the pinion $r$ gives tension to the barrel-spring, one end of which is fixed to the movable shaft $G'$, so that as soon as the lever $g$ is released at any point of its stroke the barrel-spring expends its tension and turns the pinion $r$ in the opposite direction and returns the segment $p$ and the lever $g$ to their first or uppermost position.

So long as the lever $g$ is not moved down to the very end of its stroke the pinion $r'$ continues to turn idly on the shaft B whether the lever $g$ is moving down or up, and the driving-shaft, as well as all the mechanisms of the apparatus, remains inoperative; but if the operating-lever $g$ is moved down to its lowermost position a cam $p^2$, carried by the segment $p$ on one of its faces, is made to act on the pin $s'$ of an oscillating lever $s$, causing the latter to rise and its second pin $s^2$ to move out of the slot in the disk $x$, fixed on the driving-shaft B. At the same time a pawl $r^2$, carried along by the pinion $r'$ in its rotation and which is held by its spring $r^3$ on the periphery of the same or two-toothed ratch $r^4$, fixed on the driving-shaft B, Figs. 7 and 8, falls into one of the notches of the said cam. If the operating-lever is then released, the segment $p$ and the pinion $r'$ turn in the opposite direction, the barrel-spring expending its tension or energy, and the pawl $r^2$ causes the cam $r^4$ and the driving-shaft B to turn.

The relative diameters of the segment $p$ and of the pinion $r'$ are such that when the lever $g$ passes from its lowermost to its uppermost position the driving-shaft B rotates exactly to the extent of half a revolution, at the end of which the pin $s^2$ of the lever $s$ falls into the second slot of the disk $x$, fixed on the driving-shaft, which slot is diametrically opposed to the first slot in which the pin $s^2$ was placed when the operation began. The lever $s$ is constantly drawn toward and against the cam $x$ by its spring $s^3$; but during the rotation of the same, and after it has lost contact with the cam $p^2$, Fig. 5, a second stop-lever $s^4$ holds the lever $s$ up by interposing instead its heel $s^5$ under the third pin $s^6$ of the said lever $s$, Figs. 5, 7, and 8. For this purpose the stop-lever $s^4$ oscillates on its pivot $s^7$ and is subjected to the action of a spring $s^8$, but a roll $s^9$, carried by a pin of the said lever, rests when the operating-lever $g$ is in its uppermost position on the highest face of the cam $p^3$, carried by the segment $p$ on its periphery, whereby the heel $s^5$ of the lever $s^4$ is held clear of the pin $s^6$. When the lever $g$ is moved down to its full extent, the cam $p^3$ clears the roll $s^9$, and as soon as the lever $s$ is moved up by the second cam $p^2$ the heel $s^5$ falls under the pin $s^6$ and holds the lever $s$ in its uplifted position and the pin $s^2$ clear of the disk $x$. The operating-lever now moving automatically up the segment $p$ turns and presents its cam $p^3$ under the roll $s^9$, the heel $s^5$ releases the pin $s^6$, and the pin $s^2$ falls onto the disk $x$, entering the slot thereof at the end of the upward stroke, which limits the rotation of the driving-shaft B of the pinion $r'$ and of the segment $p$. Therefore when the operating-lever $g$ is moved down and then released it moves automatically up into its first position while the driving-shaft B is rotating to the extent of half a revolution. The lever $g$ is moved down a second time and then released. It moves automatically up again, and the driving-shaft B again turns to the extent of half a revolution in the same direction as its first rotation—that is to say, the said shaft and all the devices which it operates come back into their first position or position of rest.

The driving-shaft B carries six fixed cams, which operate the several mechanisms of the apparatus, Fig. 16. When after having once moved down the lever $g$, it is allowed to move up automatically the rotation to the extent of half a revolution by the driving-shaft causes three operations to be performed—viz., the toothed disks $f$ are locked, the sum of money is recorded on the leaf of the recording apparatus and the bill is stamped, and, finally, the shutter $i^2$ is moved up or opened.

In order to lock the toothed disks $f$, the cam H, fixed on the shaft B, operates the following device, Figs. 12, 13, 3, and 4: A fixed shaft $h$, supported by the frame of the apparatus parallel to the shaft B and extending the whole length occupied by the disks $f$, supports the bar $h'$, bent at right angles at both ends and able to turn on the said shaft $h$, Figs. 12 and 13. On the bar $h'$ are fixed flat springs $h^4$, which bear against pins on bell-crank levers $h^5$, pivoted to the shaft $h$ and independent of each other. These levers and the board constantly tend to oscillate forward toward the cashier, their supporting-shaft being placed backward; but this movement is limited by an abutment-roll $h^3$, connected to the bar $h'$ and which abuts on the cam H. The flat springs $h^4$ constantly tend to bring the rolls $h^6$, carried by the levers $h^5$ at their ends, into engagement between the special teeth $e'$ of the disks $f$; but these rolls take successively three different positions, as hereinafter described, in the spaces between the said teeth.

When the apparatus is at rest, the rolls $h^6$ are sufficiently engaged in the spaces between the teeth $e'$ to enable the said rolls, when a number is shown on the apparatus, by operating the pusher-buttons $d$ to successively release the teeth of the disks $f$ and permit the successive sums to be registered. At this moment the roll $h^3$ of the bar $h'$ rests upon the lowest part of the cam H. When the shaft B first rotates to the extent of half a revolution, the cam H presents its highest part to the roll $h^3$, connected to the bar $h'$, which then rises in approaching the horizontal arms of the levers $h^5$. The tension of the flat springs $h^4$ has increased and they strongly press the rolls $h^6$ between the teeth $e'$. On the other hand, the bar $h'$ is now in such a position that the levers $h^5$ can no longer move down sufficiently to allow the rolls $h^6$ to move out from the spaces between the teeth. Therefore when the lever $g$ arrives in its uppermost position at the end of its first movement the disks are positively locked in position, the locking of the same having begun almost from the beginning of the upward movement of the said lever.

As hereinafter described, when the driving-shaft B makes its second half-revolution, which corresponds to the second upward movement of the lever $g$, the disks and racks are automatically brought back to zero. To render this movement softer and to prevent all useless friction, the rolls $h^6$ then move entirely out of the spaces between the teeth $e'$ of the disks. For that purpose as soon as the shaft B begins its second half-revolution the cam H suddenly presents its lowest part to the roll $h^3$, and the board $h'$ oscillates and releases the levers $h^5$, which carry the rolls $h^6$. The two bent ends of the flat bar $h'$ are, moreover, connected together by a rod $h^0$, which passes above the horizontal arms of the levers $h^5$ in moving them down, so as to completely release the teeth $e'$ from the rolls $h^6$.

In order to record the sum cashed and to stamp the bill, the shaft B operates the recording apparatus by means of the two cams J and K, Figs. 16 and 17, to 20.

The recording and stamping device, Figs. 17 to 20, comprises two supports $j\,j$, suitably braced and carrying the main spindle $j'$, on which oscillates the frame $j^0$, which in its turn carries the spindles of the rollers on which the paper is wound and unwound. The recording device is placed in the general apparatus in front of a locked hinged door. It is held and guided by two slides and then by a stop cross-bar toward the buyer and by pins toward the cashier, a pivoted handle $j^2$, held down by springs, being moved into position to press against the said pins. The oscillating frame $j^0$ carries the spindles of the paper-rollers $j^3$ and $j^4$, as well as the spindle of the transmitting roller or roll $j^5$, the outer surface of which is covered with rubber. The paper band, entirely wound at first on the magazine-roller $j^3$, is then unwound from the latter, passes over the transmitting-roller $j^5$, and is wound on the receiving-roller $j^4$. The roller $j^3$, carrying the white paper, is free to turn on its spindle, which has at one end a button $j^6$, which serves as a handle to draw the spindle out when it is required to put in a new roller with fresh paper. The receiving-roller $j^4$ can also be taken out by moving up the handles of the spring-levers, which hold down, when at rest, the spindle of the said roller in the slots cut in the frame and serving as bearings for the said spindle.

In order to record the sum paid, it is sufficient to bring the roll $j^5$, over which the paper band passes, near to the segments $f^5$, carrying the figures in relief formed by points, and then to put the said roller in contact with the said segments. This result is obtained by means of a support $j^{13}$, fixed to the frame $j^0$ and adjustable as to its position, the said support carrying a roll $j^{14}$, on which acts a cam J, fixed on the driving-shaft B, Fig. 6, when the operating-lever $g$ is moved upward in its first movement. The whole of the frame $j^0$ moves on the spindle $j'$, and the roller $j^5$, over which passes the paper band $j^{11}$, presses against the points of the segments $f^5$, which print on the paper the sum of money shown at the windows of the desk, Fig. 6. The cam J releases the roll $j^{14}$ at the end of the upward stroke of the operating-lever $g$, and a spring $j^{15}$ brings the frame $j^0$ back each time into its first position. At the same time that the sum is recorded on the paper band $j^{11}$ the bill is stamped. For that purpose before moving the lever $g$ the cashier puts the said bill into the slot or slit $j^{16}$ made toward him in the casing of the desk, Figs. 1 and 6. The said bill or sheet is guided by the blades $j^{17}$, between which pass the segments $f^5$, carrying the figures in relief. When the frame $j^0$ oscillates, the roll $j^5$ presses simultaneously the bill and the paper band $j^{11}$ against the points of the segments, so that the said points pass through two thicknesses of paper. When the cam J releases the roll $j^{14}$ and the frame $j^0$ returns to its position of rest, the blades or guides $j^{17}$ separate the bill from the points which served to perforate it as an equivalent of stamping.

One of the faces of the roller $j^4$ carries a ratchet $j^7$, operated by a pawl $j^8$, pivoted to the lever $j^9$. The said lever $j^9$, which itself is pivoted at one end to the movable frame $j^0$, carries at its other end a roll $j^{10}$, on which acts, during the second upward movement of the operating-lever $g$, the cam K, fixed on the driving-shaft B, Figs. 3 and 5. The roller $j^4$ turns to a certain extent, so as to wind a certain length of paper band and to present to the roll $j^5$ where the recording is made a fresh part of the paper band $j^{11}$. A stop-pawl $j^{12}$ prevents the ratchet $j^7$, and consequently the roller, from turning backward.

When the operating-lever $g$ arrives at the end of its upward stroke in its first movement, the shutter $i^2$ rises and uncovers the window $b^2$. To effect this, a cam I, fixed on the driving-shaft B, acts at the proper time on a roll $i'$ at the end of one of the arms of the bell-crank lever $i$, pivoted to the shaft A, at the end of the other arm of which lever $i$ is attached the shutter $i^2$, Figs. 14, 1, and 5. At its other end the shutter $i^2$ is attached to the arm $i^3$, also pivoted to the shaft A, and which is subjected to the action of a returning-spring $i^4$. As soon as the cam I releases the roll $i'$ the said spring $i^4$ brings the shutter down over the window $b^2$. When after having moved the lever $g$ down a second time it is allowed to move automatically up, the second half-revolution which is then made by the driving-shaft B causes four operations to be performed, as follows: The toothed disks $f$ are released by the flat bar or shelf $h'$, which is moved down. The endless band of the recording device is moved forward. The disks $f$ and the segments $f^2$ and $f^5$ are brought back to zero, and the bell is rung.

The two first operations have hereinbefore been described in detail. The return to zero of the disks $f$, of the segments $f^2$ and $f^5$, of the racks $c$, and of the pusher-buttons $d$ $d'$ is effected as follows: A cam Q, fixed on the driving-shaft B, Figs. 9, 11, and 6, acts on a roll $q$, attached to a toothed segment $q'$, loosely mounted on its spindle $q^0$, fixed on the frame of the apparatus. When rotating, the segment $q'$ moves forward a circular pinion $q^2$, loosely mounted on the shaft A of the disks $f$, and thus causes to rotate in the proper direction a flat bar or shelf $q^3$, attached by an arm to the hub of the pinion $q^2$ and supported by a second arm $q^4$, loosely mounted on the shaft A, Figs. 9 and 11. When rotating, the flat bar $q^3$ comes successively in contact with the heels of the recording-segments $f^5$ and carries the same forward, and with them the segments $f^2$ and the disks $f$, so that at the end of the stroke of the said flat bar $q^3$ all the disks $f$ and all the segments are brought back to zero. The racks $c$ and the pusher-buttons $d$ have been moved on by the disks, and the pusher-buttons have been moved into contact with the upper back part of the slides $e$, whereby the stopping position of all the disks and segments is positively fixed.

When the mechanism comes to its position of rest—that is to say, when the shaft B has finished its second half-rotation—the bell is rung. To effect this, a cam T, fixed on the driving-shaft B, moves up a hammer $t'$ and gives tension to a spiral spring $t^2$, wound around the spindle on which the lever of the said hammer $t'$ oscillates, Figs. 2 and 3. The cam T lets fall the hammer $t'$ on the bell $t^3$ when the shaft B completes its revolution. This ringing of the bell announces that the cashier has just received a sum, which he must have recorded on the apparatus.

Lastly, my apparatus comprises a centrifugal-force regulator $v$, which constantly rotates when the driving-shaft B is in movement, Figs. 3, 4, and 5. To effect this, the said regulator is mounted on a horizontal spindle $v'$, on one end of which is a worm, which gears with a helical wheel $v^2$, loosely mounted on the shaft G' of the driving-barrel and carrying on one of its faces a pawl $v^3$, which engages its end between the teeth of the ratchet-wheel $v^4$, integral with the pinion $r'$, which gears with the great toothed segment $p$. When the operating-lever $g$ is moved down, the pawl $v^3$ slides over the teeth of the ratchet-wheel $v^4$; but as soon as the said lever moves up the pinion $r'$ and the ratchet-wheel $v^4$ rotate in the contrary direction, the pawl being moved forward, and with it the helical wheel, the worm, and the regulator. The said regulator is essentially formed by two horizontal arms $v'$ $v'$, pivoted to the cross-piece $v^5$, and which carry at their ends small cylindrical masses $v^6$. A spiral spring $v^7$ tends to draw the said arms the one toward the other, and the cylindrical masses $v^6$ rotate in a circular cup $v^8$, against the inner edge of which they come and rub, through the effect of the centrifugal force, when the speed of rotation becomes too great. The said regulator is loosely mounted on its spindle $v'$, and its effect is produced by the simple rubbing of a flat spring $v^9$, carried by a cross-piece of the said regulator, on a piece $v^{10}$ of the spindle $v'$, Fig. 3.

I claim—

1. In cash registering and recording mechanism, an operating-lever therefor, in combination with a toothed segment actuated by the said lever, two pinions $r$ $r'$ meshing with the said segment, a spring-barrel having a rotary shaft on which the said pinion is fast a driving-shaft having the pinion $r'$ mounted thereon, cams fast on the said shaft for operating the various sets of devices, and means for allowing the pinion $r'$ to rotate idly on the said shaft when the said lever descends, but causing it to turn the said shaft when the said lever reverses its motion, while the spring-barrel returns the said segment to its first position substantially as set forth.

2. In cash registering and recording mechanism, an operating-lever therefor having an arm extending within the casing in combination with a toothed segment actuated by the said arm when the said lever is depressed, a spring for automatically raising the said lever, two pinions $r$ and $r'$ which mesh with the said segment, a spring-barrel having the pinion $r$ fast on its rotary shaft, a driving-shaft having cams fast thereon for operating the various sets of devices of the machine, and means for allowing the pinion $r'$ to rotate idly on the said shaft when the said lever descends, but causing it to turn the said shaft when the said lever automatically moves upward, while the spring-barrel automatically returns the said segment to its first position substantially as set forth.

3. In cash registering and recording mechanism, a lever operating the same and a segment actuated by the depression of the said lever, in combination with two pinions $r$ $r'$ meshing with the said segment, a spring-barrel having one of the said pinions, $r$, fast on its rotary shaft, a driving-shaft having the other pinion $r'$ mounted thereon, and means for fastening the pinion $r'$ on the said driving-shaft when the said lever moves automatically up, though leaving it loose thereon while the said lever is depressed, the said means consisting of a toothed cam or ratchet fast on the driving-shaft, a pawl carried by the pinion $r'$ and in contact with the periphery of the said ratchet, a slotted disk fast on the driving-shaft, a lever having a pin which falls into the said slots and acts as a stop and a cam carried by the said segment and arranged to lift the said lever when the latter reaches its lowest position, thereby moving the said pin out of the slotted disk $x$, whereby the pinion $r'$ is enabled, while the barrel-spring is expending its tension, to cause the driving-shaft to rotate through half a revolution substantially as set forth.

4. The combination of the operating-lever $g$ with a toothed segment $p$ which it actuates, two pinions $r$ $r'$ gearing with the said segment, a spring which drives the pinion $r$, a driving-shaft on which the pinion $r'$ is mounted, a ratchet and pawl for locking the said pinion $r'$ to the said driving-shaft, and a slotted disk, a lever and pin engaging therewith, and a cam acting to lift said lever and free the pin from the said disk the above parts coöperating to allow the lever to move in one direction without affecting the driving-shaft, although its movement in the opposite direction rotates the said shaft substantially as set forth.

5. In cash registering or recording mechanism, the combination of indicator-actuating toothed disks $f$ and means for turning them step by step at will, with devices for fixing the said disks while the sum received is being registered or recorded, the said devices consisting of a driving-shaft, a cam H carried thereby, a roll $h^3$ arranged to be acted on by the said cam, a spring-pressed bar to which the said roll is attached and which is moved by the said cam into locking position, levers carrying means for engaging disks $f$ and locked by the said cam and bar in such engagement, and an attachment of the said bar which acts on the said levers to free the said disks when the said bar oscillates in the opposite direction during the return of the said disks to zero substantially as set forth.

In witness whereof I have hereunto set my hand in presence of two witnesses.

HENRY POTTIN.

Witnesses:
 GEORGES LAURENT,
 EUGÈNE WATTIER.